US005656680A

United States Patent [19]

Aguirre et al.

[11] Patent Number: 5,656,680

[45] Date of Patent: Aug. 12, 1997

[54] COMPOSITIONS COMPRISING MIXTURES OF SILICONE FLUIDS AND PEPTIZING AGENTS HAVING USE AS RUBBER PROCESSING AIDS

[75] Inventors: Enrique Aguirre, Hackensack; Paul R. Yankner, Englewood, both of N.J.

[73] Assignee: Technical Processing, Inc., Paterson, N.J.

[21] Appl. No.: 43,140

[22] Filed: Apr. 2, 1993

Related U.S. Application Data

[63] Continuation-in-part of Ser. No. 561,803, Aug. 2, 1990, abandoned, which is a continuation-in-part of Ser. No. 378,646, Jul. 12, 1989, abandoned, which is a continuation of Ser. No. 331,698, Mar. 31, 1989, abandoned, which is a division of Ser. No. 331,690, Mar. 31, 1989, abandoned.

[51] Int. Cl.$^6$ .................................................. C08K 5/42
[52] U.S. Cl. ................ 523/333; 524/158; 524/269; 524/301; 524/316; 524/392; 524/225; 524/318; 524/189; 524/493; 508/202; 508/271

[58] Field of Search .................... 524/158, 269, 524/301, 316, 493, 392, 225, 318, 189; 523/333; 252/33.3, 33.4; C10M 107/46

[56] References Cited

U.S. PATENT DOCUMENTS 4,010,129  3/1977  Aron ........................................ 524/159

Primary Examiner—Mark D. Sweet
Attorney, Agent, or Firm—Kenyon & Kenyon

[57] ABSTRACT

The invention provides a processing aid and method for lubricating and improving the processability and releasability of rubber and plastic without adversely affecting and, in certain instances, improving the physical properties of the rubber or plastic such as adhesion, tack, modulus and tensile strength. The processing aid comprises a pre-formed homogeneous mixture of at least one silicone fluid lubricant and at least one peptizing agent. A preferred processing aid also includes a silicone fluid wetting agent, which affords decreased vulcanization times and increased production rates.

26 Claims, No Drawings

COMPOSITIONS COMPRISING MIXTURES OF SILICONE FLUIDS AND PEPTIZING AGENTS HAVING USE AS RUBBER PROCESSING AIDS

Continuation-in-part application prior application Ser. No. 07/561,803, filed on Aug. 2, 1990 now abandoned, which was a continuation-in-part of application Ser. No. 07/378,646 filed on Jul. 12, 1989, (now abandoned), which was a continuation application of application Ser. No. 07/331,698 filed on Mar. 31, 1989, (now abandoned) which is a divisional application of application Ser. No. 07/331,690 filed on Mar. 31, 1989 (now abandoned).

FIELD OF THE INVENTION

This invention relates to novel compositions comprising mixtures of silicone fluids and peptizing agents. More particularly, this invention relates to novel compositions comprising mixtures of at least one silicone fluid lubricant and at least one chemical peptizing agent. In a preferred aspect, this invention relates to compositions comprising at least one silicone fluid lubricant, at least one silicone fluid wetting agent, and at least one chemical peptizing agent.

All of the silicone fluid lubricant-peptizing agent mixtures of this invention have utility as rubber processing aids. When the composition also contains a silicone fluid surfactant, a superior class of rubber processing aids is obtained.

BACKGROUND OF THE INVENTION

Silicone fluids have been used as lubricants and as surfactants, but their use as rubber processing aids has been limited and/or unsatisfactory.

For example, silicone fluid lubricants have been used as external lubricants or release agents, i.e., they have been applied to the surfaces of molds, dies, etc., but normally they do not possess acceptable compatibility with rubber for internal use. Mixing these silicone lubricants directly (i.e., internally) into rubber compounds, even at small concentrations, can cause serious loss of tack and adhesion. A further disadvantage is that the silicone bleeds out of the vulcanizate.

U.S. Pat. No. 2,720,495 to Phreaner discloses that incompatible silicone fluids can be incorporated into rubber compounds by mixing them with inorganic alkaline earth metal silicates, such as calcium silicate, and a silicone polymerization catalyst, such as calcium magnesium or iron oxide. According to Phreaner, the silicone-silicate filler composition imparts improved resistance to oil-induced swelling, improved rupture and abrasion resistance, and improved plasticity in milling, extruding and molding of the rubber, but no data are provided substantiating those claims. Furthermore, Phreaner does not truly render the silicone fluid compatible with rubber. Rather, Phreaner disperses the silicone fluid on large amounts of silicate filler (ratios of silicate filler to silicone of from 4:1 to 100:1). If the silicone fluid is not sufficiently absorbed by the large amount of silicate, the silicone fluid can separate from the silicate in the rubber compound and cause characteristic silicone defects such as lower adhesion, poorer physical properties, and bleeding of the silicone fluid from the vulcanizate.

Peptizing agents have long been added to rubber compounds. Because crude rubber has a very high viscosity, it cannot be easily and quickly mixed with additives, such as vulcanizing agents, plasticizers, extenders, fillers, pigments, and the like, prior to vulcanization. In order to do so, the crude rubber must first be broken down into a soft, plastic state. This procedure, which is often referred to as mastication, involves mixing rubber with a peptizer (plasticizer) while subjecting the rubber to heat. The peptized rubber is then cooled and then mixed with other additives.

The use of processing aids to facilitate the mixing of rubber and plastic compounds is generally known in the art. For instance, U.S. Pat. No. 3,787,341, Reissue Pat. No. 29,821 to Aron, teaches the use of a certain homogeneous mixture which, along with the other additives, is added directly to crude rubber in the mixing step and which eliminates the need for a separate mastication step. The homogeneous mixture comprises an alkali metal salt of an aromatic sulfonic acid (e.g., potassium dodecylbenzene sulfonate) and a long chain fatty acid (e.g., stearic acid), and is added in an amount of from about 0.5 to about 2 percent by weight of the composition. Preferably, the homogeneous mixture also includes such additional materials as aromatic esters, compounds with alcoholic and glycolic hydroxyl groups, potassium or sodium soaps of fats or fatty acids, other soaps of metals such as zinc, magnesium, calcium or barium, and a paraffin. U.S. Pat. No. 3,882,062 to Aron teaches that thioethers catalyze the action of the homogeneous mixtures.

U.S. Pat. No. 4,534,799 to Aguirre discloses a processing aid which enhances the wetting characteristics of natural and synthetic rubbers comprising a mixture of a partially neutralized, fatty-acid modified alkylbenzene sulfonic acid, a fatty acid amide, a normally-solid polyethylene glycol, a normally-solid low density wax, and a fluorinated surfactant. In addition, the processing aid can include an inert filler and/or carrier.

To date, however, no one has provided a satisfactory rubber processing aid comprising a mixture of a silicone-fluid lubricant and a chemical peptizing agent. Applicant has discovered that such mixtures, when added to rubber, unexpectedly provide unexpected compatibility of silicone lubricants with rubber compounds, and are very effective as rubber processing aids.

For example, basic processing aids of this invention, which comprise a silicone fluid lubricant and a chemical peptizing agent, when added to a rubber compound, improve release, processability, adhesion and tack, but do not adversely affect such other physical properties of the rubber as tensile strength, elongation, modulus, etc. These processing aids can so facilitate the release of rubber compounds that external lubricants need not be applied to the molds in order to release molded parts.

Processing aids comprising a silicone-fluid surfactant in addition to the lubricant and peptizing agent have the additional ability to decrease vulcanization cure time, and thus increase the production rate of vulcanized rubber.

It is one object of this invention to provide a silicone-fluid based processing aid which is truly compatible with rubber compounds, and which does not require silicate fillers.

It is a further object of the present invention to provide a processing aid and a method for incorporating a silicone fluid lubricant into a rubber without adversely affecting the physical properties of the rubber.

It is a further object of the invention to provide a rubber compatible, silicone-based processing aid and a method for imparting excellent release and processing properties to a rubber compound without adversely affecting such properties as adhesion, tack, modulus and tensile strength.

It is yet a further object of the invention to provide a rubber compatible, silicone-based processing aid and a method for increasing the compatibility and dispersion of lubricants in a rubber compound, thereby providing a higher degree of wetting.

It is another object of the present invention to provide a novel rubber compatible, silicone-based processing aid and a method for facilitating the breakdown of a rubber and thereby eliminate the need for a separate mastication step plus a lubrication step.

It is yet another object of the present invention to provide a rubber compatible, silicone-based processing aid and a method for reducing the viscosity of a rubber compound, thereby reducing the mixing time required for homogenizing the rubber compound and providing better dispersion of ingredients in such compounds than have been achieved by use of known processing aids and methods.

It is yet another object of the present invention to impart to cured rubbers an improved resistance to ozone and oxygen degradation and improved physical properties, such as tensile, modulus, elongation, compression set and flexing.

Other objects of the present invention include the provision of improved flow, mixing and extrusion characteristics of rubber and plastic compounds, along with the possibility of uninterrupted working of the mixed compositions, and lower, safer dump temperatures, without adversely affecting the physical properties of the rubbers.

It is a further object of this invention to provide a rubber-compatible, silicone-based processing aid which causes a reduction in vulcanization cure time, and thus permits increased production rates of vulcanized products.

A still further object of this invention is provision of a rubber-compatible, silicone-based processing aid which improves the molding characteristics of the rubber compound and the physical properties of the vulcanized rubber product.

Still another object of this invention is a vulcanized rubber product having improved properties produced through use of the processing aid of this invention.

Another object of this invention is an improved method for producing vulcanized rubber products by mixing the silicone-based processing aid of this invention with a rubber compound, and thereafter molding and vulcanizing the rubber compound.

SUMMARY OF THE INVENTION

In accordance with the above-mentioned objectives and others, the present invention provides: (1) a novel basic processing aid comprising a pre-formed mixture of at least two essential ingredients, a silicone fluid lubricant and a chemical peptizing agent; and (2) a method for improving the processability and releasability (from molds) of rubber compounds and for improving the dispersion of ingredients in such compounds by incorporating into the compounds the pre-formed processing aid.

A particularly preferred form of the processing aid of this invention comprises a pre-formed blend of at least three essential ingredients: (1) a silicone fluid lubricant; (2) a silicone fluid wetting agent; and (3) a peptizing agent.

The processing aid also can contain other components, such as fillers, other processing aid materials, and the like.

The processing aids of the present invention permit the internal use of large concentrations of normally unusable silicone lubricants by rendering them compatible with the rubber without compromising such physical properties of the rubber as adhesion, tack, tensile strength, modulus, and elongation. Use of the processing aid and method of the present invention with rubber compounds (both natural and synthetic) eliminates or reduces the need to spray external mold lubricants onto mold surfaces to permit release of molded parts. The invention further allows for better dispersion of other compound ingredients into rubber compounds by reducing the viscosity of the rubber so as to facilitate the mixing thereof. In addition, better wetting for pigments and fillers which are added to the rubber is provided and the tendency of the rubber to stick to the mill roll during processing is reduced. Rubber treated in accordance with the method of the invention also exhibits better resistance to degradation caused by ozone and oxygen and improved physical properties. Finally, the presence of the silicone fluid wetting agent in the mixture materially reduces curing time.

DETAILED DESCRIPTION OF THE INVENTION

The processing aid composition of this invention comprises a preformed blend of at least one silicone fluid lubricant in order to reduce the coefficient of friction of the rubber compound, and at least one peptizing agent to render the normally incompatible silicone fluid compatible with the rubber.

Suitable lubricating agents include the class of silicone fluids known as general purpose silicone fluids. General purpose silicone fluids do not have terminal functional groups and, therefore, they are materials of very low reactivity in the presence of other chemicals. However, reactivity of the silicone lubricant is not required in the present invention.

Substituents on the silicone atoms of general purpose silicone fluids consist exclusively of methyl groups or oxygen. The termination of the polymer chains prevents viscosity change and other alterations to physical properties. The simplest of these silicone fluids are the trimethylsiloxy-terminated polydimethylsiloxanes which exhibit the following basic structure:

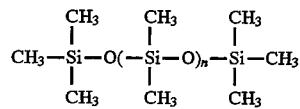

where n is a number determined by the size of the molecule. These basic general purpose silicone fluids range in molecular weight from about 200 to over 400,000, and are thermally stable indefinitely at 150° C. It has been found that silicone fluids having kinematic viscosities of up to about 60,000 centistokes, and preferably between 5,000 to 60,000, are especially useful as lubricants. Examples of commercially-available general purpose polydimethylsiloxanes which can be used in the invention are Viscacil 10M and Viscacil 30M from the General Electric Co.

Although the general purpose silicone fluids are preferred because of their low cost and broad range of molecular weights, the silicone used as a lubricating agent in this invention also can be a functionally terminated silicone fluid or resin. Such compounds can be represented by the general formula:

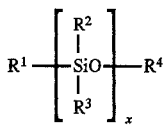

wherein each of $R^1$, $R^2$, $R^3$ and $R^4$ is a hydrocarbyl, e.g., alkyl or aryl, or hydrocarboxy, e.g., alkoxy or aryloxy, group, and at least one of which is substituted with a functional group and x is a number determined by the size of the silicone lubricant. Typical functional groups are amine, hydroxyl or epoxy groups, with primary amine groups being preferred.

In most commercially-available silicone lubricants, the $R^1$, $R^2$, $R^3$ and $R^4$ moieties are alkyl of up to about 10 carbons or phenyl. As a general rule, these moieties are predominantly, or entirely methyl.

The moiety containing the functional group can be alkyl or aryl, but commonly is aminoalkyl, e.g., aminopropyl, or hydroxyalkoxy, e.g., 2-hydroxyethoxy or carboxyalkyl, e.g., carboxypropyl. Amine-terminated functional silicone fluids are especially preferred.

Examples of commercially-available functionally terminated silicone fluids which are useful in this embodiment of the invention include amine-terminated methylalkyl siloxanes such as SF-1080, commercially available from General Electric Co.; alkyl modified silicone fluids such as SF-1076 commercially available from General Electric Co.; silicone fluids with epoxyalkyl end groups such as L-9000 commercially available from Union Carbide Corp.; carboxypropyl-terminated dimethylalkyl siloxanes such as PS-563 available from Petrack System, Inc.; and a polydimethylsiloxane such as Dow Corning 193, commercially available from Dow Corning Corp.

Another type of reactive silicone lubricant is the silanol-terminated polydimethyl siloxanes, in which $R^1$ and $R^4$ of the above formula are hydroxyl, and $R^2$ and $R^3$ are methyl. An example of this type of silicone lubricant is PS-341 supplied by Petrack System, Inc.

Vinyl-terminated polydimethyl siloxanes, in which $R^1$ and $R^4$ are vinyl and $R^2$ and $R^3$ are methyl, such as PS-445 available from Petrack System, Inc., also may be used in accordance with this invention.

Aromatic modified silicones also have been found to be of use in this invention. They contain a phenyl group which is introduced as a phenylmethylsiloxane or a diphenylsiloxane according to the formula:

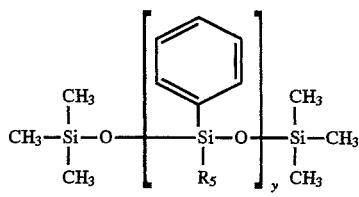

where $R_5$ is methyl or phenyl, and y is a number determined by the size of the molecule. They improve lubricity, oxidation resistance, thermal stability and may work in a service temperature between $-55°$ C. to $290°$ C.

The second essential component of the basic processing aid of this invention is a chemical peptizing agent which, in combination with the lubricating agent, renders the lubricating agent compatible with the rubber. In general, chemical peptizers are known in the art to be materials which accelerate the softening (i.e., breakdown of viscosity) of rubber upon mastication (i.e., degradation). These substances are occasionally designated as "radical acceptors" when they facilitate the mechano-chemical scission of rubber during cold mastication, or as "promoters of oxidative scission" of rubber when they facilitate mastication of rubber at elevated temperatures.

Examples of commercially-available chemical peptizing agents which can be used in the method of the present invention include: thiazole accelerators (for example, mercaptobenzothiazole and cyclohexybenzothiazole sulphenamide); phenyl hydrazine (and its derivatives which are known peptizers); the known organic-sulphur compound peptizers (for example, thio-β-naphthol); and the known class of alkyl and aryl mercaptan peptizers (for example, xylyl mercaptan and pentachlorothiophenol and its salt, zinc pentachlorothiophenate), and dithio-bisbenzanilides.

The peptizing agent used in the invention can also be an alkylbenzene sulfonic acid (a plasticizing-type peptizer) which is represented by the structural formula:

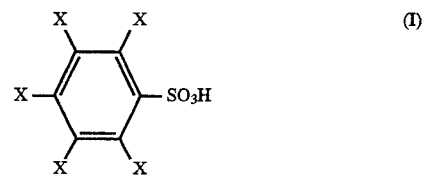

wherein each X, independently, is hydrogen or straight or branched chain alkyl of up to about 14 carbon atoms, provided that at least one X is alkyl. Each X preferably contains at least 4 carbon atoms. Preferred alkylbenzene sulfonic acids are represented by the formula:

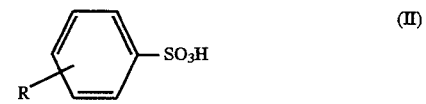

wherein R is branched or straight chain alkyl of from about 8 to about 14 carbon atoms. Dodecylbenzene sulfonic acid is illustrative and preferred.

The basic processing aid of this invention is a pre-formed blend of the silicone lubricant and the peptizing agent, in which the ratio of silicone lubricant to peptizing agent is such that the silicone lubricant is rendered compatible with the rubber compound to which it is added. As is evident from the following examples, the weight ratio of silicone lubricant to peptizing agent can be as low as 0.2:1 up to 2:1 or even higher, e.g., 5:1 or even 15:1.

When the lubricating agent is a functionally-terminated silicone fluid with a terminal primary amine and when the peptizing agent is alkylbenzene sulfonic acid, it has been found that good results are achieved when the proportions are such that there is at least one sulfonic acid group ($—SO_3H$) per primary amine group ($—NH_2$). The ratio can be as high as 5 to 1, or even higher, but normally ratios of from about 1:1 to about 2:1 are preferred. When the sulfonic acid is dodecylbenzene sulfonic acid and the silicone resin is an amine terminated resin the weight ratio of dodecylbenzene sulfonic acid to silicone resin can vary from about 1:1 to about 5:1, but preferably is in the range of from about 1:1 to about 3:1.

A particularly preferred form of the processing aid of this invention includes as a third essential component a silicone fluid surface active or wetting agent. Such wetting agents comprise a hydrophobic siloxane chain or backbone having hydrophilic groups, such as dimethyl silicone polymers containing hydrophilic polyether groups, which may be attached to the silicone backbone through hydrolyzable (Si—O) or non-hydrolyzable (Si—C) linkages. These wetting agents, like the silicone fluid lubricants, are incompatible with rubber, but, when pre-mixed with the peptizer, form a rubber-compatible composition.

A preferred class of such wetting agents is formed by reaction of a dimethyl silicone polymer, having at least one methyl group replaced by a hydrogen atom, with an alkylpolyalkylene oxide, preferably an alkyl polyethylene or polypropylene or mixed polyethylene-polypropylene oxide. The hydrogen-containing silicone fluid can be represented by the formula:

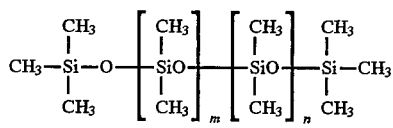

wherein m and n are numbers determined by the size of the molecule, and n is at least 1. The alkyl polyalkylene oxide is represented by the formula:

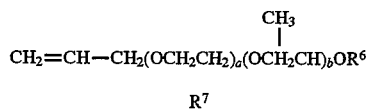

wherein a and b separately may be 0 or a number determined by the size of the molecule, and at least one of a and b is other than 0. The resulting surfactant may be represented by the formula:

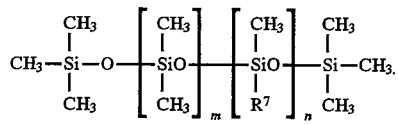

The properties of the individual surfactants will vary depending upon the values of m, n, a and b, which in turn affect the size of the hydrophobic silicone chain as well as the size, number and nature of the pendant hydrophilic polyalkylene oxide chains.

Suitable wetting agents are those sold by Union Carbide Corporation under the trademark SILWET, including SILWET L-77, SILWET 7002, and the like, as well as organosilicone surfactants such as polydimethylsiloxane/polyethylene oxide/polypropylene oxide copolymers sold by General Electric Co., for example, SF-1188 surfactant.

The processing aid comprising the pre-blended silicone lubricant, silicone surfactant and peptizing agent has the additional advantage of decreasing the cure time, or time to vulcanize the rubber compound, and thus permit increased production rates of cured or vulcanized rubber products. In experiments conducted to date, the vulcanization time has been reduced by as much as 20 to 33 percent, resulting in a corresponding potential increase in production rate.

The three-component processing aid, like the two-component processing aid discussed above, is formed by pre-blending the silicone lubricant, silicone surfactant and peptizing agent. In making such three-component preblends, the proportions of the three components are sufficient to render the silicone components compatible, to improve physical properties of the cured rubber, and to reduce vulcanization time.

Considering only the three essential ingredients, the proportions in by percent weight are:

30–70 weight percent silicone lubricant;

3–40 weight percent silicone surfactant; and

25–65 weight percent peptizer. The actual proportions will vary, however, depending upon the form of the processing aid. Preferred proportions of the three essential ingredients are:

50–70 weight percent silicone lubricant;

10–15 weight percent silicone surfactant; and

25–35 weight percent peptizer.

Although the processing aid of this invention can consist solely of the silicone lubricant, the peptizing agent, and the silicone surfactant if desired, it also can include other ingredients, such as other processing aids used in the compounding of rubber, fillers, and other conventional additives.

I have found that one desirable form of processing aid is a powder form prepared by dispersing the two or three essential ingredients on a particulate carrier. Suitable carriers include particulate silica, particulate alumina and particulate alumino-silicates, such as clays.

Preferred particulate supports have a surface area of from about 100 to about 400 $m^2$/gram and a particle size of from about 1 to about 15 microns. Effective solid carriers include silicone dioxide powders having an average particle size of from about 7 to about 50 microns and a surface area of from about 150 to 400 $m^2$/gram. Preferred silica supports include those sold commercially under the trade designations Cabo-sil (Cabot Corp.) and Sipernat (Degussa Corp.). Still other solid carriers include clay powders having a surface area of about 100–125 $m^2$/gram and a particle size of less than approximately 15 microns, preferably from about 1 to about 5 microns, with less than about 2 microns being more preferred. Preferred clays include those sold commercially under the trade designations Hi-Sil 233 (P.P.G. Industries), Attasorb LVM (Engelhard), Microsil (Crossfield), and Vulkasil (Bayer).

A particularly preferred solid carrier comprises a mixture of from about 40 to about 60 percent silicone dioxide and from about 60 to about 40 percent clay, with mixtures having over 50 percent clay and less than 50 percent silica being preferred.

When the active ingredients of the three-component processing aid are dispersed on a solid carrier to provide a powdered processing aid, I have found it necessary to increase the proportions of both the surfactant and the peptizer relative to the lubricant. In such a case, preferred proportions are:

25–35 weight percent silicone lubricant;

35–45 weight percent silicone surfactant; and

25–35 weight percent peptizer.

A highly preferred liquid or paste form of the processing aid of this invention is obtained by dispersing the mixture of the essential ingredients in a suitable liquid or semi-solid carrier, preferably a higher molecular weight hydrocarbon wax which is compatible with rubber, such as petrolatum, a paraffin wax or a polyethylene wax. These waxes enhance the lubricity of the processing aid, thereby improving its effectiveness.

When the active ingredients of the three-component processing aid are compounded with liquid or semi-solid carriers to form a liquid or paste form processing aid, the amount of silicone surfactant is decreased slightly while the amount of peptizer is increased. Preferred formulations contain the active ingredients in the following proportions:

30–40 weight percent silicone lubricant;
3–10 weight percent silicone surfactant; and
50–65 weight percent peptizer.

In addition to the essential ingredients and the carrier, if used, still other processing aids may be incorporated into the processing aid composition of this invention. For example, a processing aid blend of the type disclosed in U.S. Pat. No. 4,534,799, whose disclosure is incorporated herein by reference, may be used. These formulations comprise a partially-neutralized fatty acid-modified alkyl benzene sulfonic acid, which also may be mixed with an ester of a fatty acid, a fatty acid amide, and polyethylene glycols.

As disclosed in U.S. Pat. No. 4,534,799, from about 1 to about 3 moles of a fatty acid, preferably one having from 10 to about 20 carbons, is reacted with one mole of an alkylbenzene sulfonic acid of the formula:

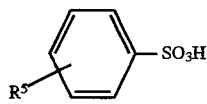

wherein $R^5$ is alkyl of 10 to 14 carbons, preferably 12 carbons to a pH of 2 to 3; the reaction product is partially neutralized to a pH of from about 4.5 to about 6.5 with an organic or inorganic base, preferably a hydroxy lower alkyl amine; and the resulting product is mixed with a lower alkyl, preferably isopropyl, ester of a long chain fatty acid of from about 14 to about 22 carbon atoms in an amount of up to about 35 weight percent of the composition. One formulation found to be particularly useful is one identified as X-100, which is made by reacting 20 parts of dodecylbenzene sulfonic acid with 52 parts of lanolin, neutralizing with 8 parts of triethanolamine and adding 20 parts of isopropyl myristate.

Another processing aid blend found to be useful comprises a mixture of from 50–60 percent petrolatum, 3–10 percent zinc oxide, and 15–25 percent isopropyl myristate. A particularly preferred form, identified as X-90, comprises a mixture of 55 parts of oleic acid, 20 parts petrolatum, 5 parts zinc oxide, and 20 parts isopropyl myristate.

Preferred powder formulations based upon this invention comprise from about 20 to about 50 weight percent of particulate carrier, from about 1 to about 20 weight percent of a silicone fluid lubricant, from about 6 to about 25 weight percent of a silicone fluid wetting agent, from about 1 to about 20 weight percent of a peptizing agent, and up to about 30 weight percent of a non-silicone lubricant, such as isopropyl myristate or Z-90 lubricant. In such a composition, the silicone fluid lubricant preferably is SF-1080 sold by General Electric Co., the silicone fluid wetting agent preferably is at least one, and preferably both, of SILWET Copolymer L-77 and SILWET Copolymer L-7602, and the peptizing agent is preferably at least one, and most preferably both, of pentachlorothiophenol and dodecylbenzene sulfonic acid.

A particularly preferred powder formulation comprises 45 to 50 weight percent particulate solid carrier, 8 to 12 weight percent SF-1080 silicone lubricant, 8 to 12 weight percent SILWET L-7602 wetting agent, 1 to 3 weight percent SILWET L-77 wetting agent, 2 to 5 weight percent pentachlorothiophenol, 8 to 12 weight percent dodecylbenzene sulfonic acid, 15 to 20 weight percent of Z-90 lubricant, and 1–3 weight percent isopropyl myristate.

Preferred liquid and paste formulations comprise from about 5 to about 40 weight percent of hydrocarbon wax, from about 1 to about 10 weight percent of a silicone fluid lubricant, from about 5 to about 25 weight percent of a silicone fluid wetting agent, from about 10 to about 25 weight percent of a peptizing agent, and up to about 50 weight percent of a non-silicone lubricant.

In such a liquid or paste formulation, the carrier preferably is at least one of petrolatum or paraffin wax, the silicone fluid lubricant preferably is SF-1080, the silicone fluid wetting agent preferably is at least one of SILWET L-7602 or SILWET L-77, the peptizing agent preferably is dodecylbenzene sulfonic acid, and the non-silicone lubricant preferably is at least one of Z-90, Z-100 and isopropyl myristate.

A particularly preferred liquid or paste formulation comprises 25 to 35 weight percent of petrolatum and paraffin wax, 1 to 3 weight percent SF-1080, 10 to 15 weight percent of SILWET L-7602 and SILWET L-77, 15 to 15 weight percent dodecylbenzene sulfonic acid and 30 to 40 weight percent of Z-90, Z-100 and isopropyl myristate.

The processing aid compositions of this invention are prepared by mixing the silicone fluid lubricant, the silicone fluid wetting agent, if present, and the peptizing agent, and other ingredients if desired, by conventional techniques to form a homogeneous mixture of all ingredients. Such mixing can be effected at ambient temperature, and it is desirable to allow the resulting mixture to stand at ambient temperature for at least about one hour.

Where the peptizing agent is an alkylbenzene sulfonic acid, it is possible (but not necessary) to obtain a reaction product with a functionally terminated silicone fluid to obtain the processing aid. In this embodiment at least one hydrocarbyl or hydrocarboxy group of the silicone lubricant must be capable of reacting with the sulfonic acid. The reaction product of this embodiment is obtained by mixing the alkylbenzene sulfonic acid with the silicone lubricant, and heating the mixture at a temperature sufficient to allow reaction to occur. Because water is formed in the reaction, it is also desirable to employ conditions allowing removal of water. Thus, the reaction is desirably carried out at a temperature greater than 100° C. at ambient pressure, thereby allowing water to distill off. The resulting silicone-based product is more compatible with rubber than the unmodified silicone fluid.

Where the peptizer does not react with the silicone fluid, it is believed that, when it is thoroughly and uniformly mixed with the silicone fluid, it is able to modify the surface of the rubber and allow it to be wet by the silicone fluid.

The processing aid is incorporated into a rubber compound by methods generally known to the art.

The amount of processing aid of the present invention needed to achieve the improved processing or release of the rubber compositions ordinarily is from about 0.5 to about 10 percent based on the total weight of the rubber composition, and other compound ingredients. Preferably, from about 1 to about 2 percent of the processing aid is added.

The rubbers which can be improved with the processing aid of the invention include, but are not limited to, butadiene-styrene copolymers, polychloroprene and chloroprene copolymers, polyacrylonitrile and acrylonitrile copolymers, polyisoprene and isoprene copolymers, modified polyethylene, ethylene-propylene-diene polymers, polyacrylate and acrylate copolymers, polyesters and modified polyesters, silicone rubbers, chlorosulfonated polyethylene rubbers, epichlorohydrin rubbers, natural rubbers, etc. The invention is particularly useful with those elastomers having a tendency to crystallize under tension.

The following examples are illustrative of this invention, but are not intended to be limiting. Unless otherwise stated, all parts and percentages are by weight.

EXAMPLE 1

Seven different processing aids suitable for use with elastomers were prepared in accordance with the invention to determine their effect upon rubber. The components of the individual samples are set forth below in parts by weight:

| Component | Sample No. | | | | | | |
|---|---|---|---|---|---|---|---|
| | 1 | 2 | 3 | 4 | 5 | 6 | 7 |
| Zinc Oleate | 22.5 | 19.5 | 19.5 | 20 | 19.5 | 19.5 | 19.5 |
| X-100 | 10.8 | 9.4 | 9.4 | 9.6 | 9.4 | 9.4 | 9.4 |
| Tripropylene Glycol | 13.5 | 11.7 | 11.7 | 12 | 11.7. | 11.7 | 11.7 |
| Polydimethyl-siloxane (Viscacil 10M) | 23.5 | 21.1 | 21.7 | 32 | 21.7 | 21.7 | 21.7 |
| Waxes (mink wax and cetyl alcohol); Stearamide; and fluoro-surfactant | 29.7 | 25.7 | 25.7 | 26.4 | 25.7 | 25.7 | 25.7 |
| Peptizers: | | | | | | | |
| Dithio-bisbenz-anilide #80 | — | 12 | — | — | — | — | — |
| N-tallow alkyltrimethylene-diamine oleates | — | — | 12 | — | — | — | — |
| Dithio-bisbenz-anilide #44 | — | — | — | — | 12 | — | — |
| Pentachloro-thiophenol | — | — | — | — | — | 12 | — |
| Dodecyl-benzene sulfonic acid | — | — | — | — | — | — | 12 |

Each processing aid was prepared as follows. The X-100 was made by mixing 15 parts of dodecylbenzene sulfonic acid with 60 parts of lanolin, heating the mixture at a temperature of about 250° F. for about 1 hour, neutralizing the resulting mixture with 7 parts of triethanolamine, and adding 18 parts of isopropyl myristate with stirring. The X-100 was added to a kettle and heated to a temperature of 220° F. to 230° F. The mink wax, cetyl alcohol, steramide and fluorosurfactant were then added to the X-100 with stirring. The resulting mixture was cooled to about 190° F. to 200° F. whereupon the Viscacil 10M polydimethylsiloxane (molecular weight of 10,000), zinc oleate and additional peptizers (if present) were added with stirring.

Each processing aid sample was then incorporated into rubber in accordance with the invention to form seven rubber samples. Each of the seven rubber samples and a control rubber (containing no processing aid) were then processed into radial tire tread. Results of various tests conducted on each of the samples and the control during and after processing are reported in Tables 1 and 2.

TABLE 1

RESULTS OF RADIAL PASSENGER TIRE TREAD TEST.

| SAMPLES ADDED @ "1" MIN. AFTER RUBBER BREAKDOWN 40 RPM. ROTOR SPEED | CONTROL | SAMPLE No. 1 | SAMPLE No. 2 | SAMPLE No. 3 | SAMPLE No. 4 | SAMPLE No. 5. | SAMPLE No. 6 | SAMPLE No. 7 |
|---|---|---|---|---|---|---|---|---|
| SBR-1712 | 82.50 | 82.50 | 82.50 | 82.50 | 82.50 | 82.50 | 82.50 | 82.50 |
| PBD-1252 | 55.00 | 55.00 | 55.00 | 55.00 | 55.00 | 55.00 | 55.00 | 55.00 |
| ISAF-HS-BLACK-N-234 | 70.00 | 70.00 | 70.00 | 70.00 | 70.00 | 70.00 | 70.00 | 70.00 |
| STEARIC ACID | 2.00 | 2.00 | 2.00 | 2.00 | 2.00 | 2.00 | 2.00 | 2.00 |
| SUNOLITE 240 | 4.00 | 4.00 | 4.00 | 4.00 | 4.00 | 4.00 | 4.00 | 4.00 |
| ZINC OXIDE | 3.00 | 3.00 | 3.00 | 3.00 | 3.00 | 3.00 | 3.00 | 3.00 |
| SAMPLE #1 | | 2.19 | | | | | | |
| SAMPLE #2 | | | 2.19 | | | | | |
| SAMPLE #3 | | | | 2.19 | | | | |
| SAMPLE #4 | | | | | 2.19 | | | |
| SAMPLE #5 | | | | | | 2.19 | | |
| SAMPLE #6 | | | | | | | 2.19 | |
| SAMPLE #7 | | | | | | | | 2.19 |
| DUREX | 1.00 | 1.00 | 1.00 | 1.00 | 1.00 | 1.00 | 1.00 | 1.00 |
| R.M. SULFUR | 1.75 | 1.75 | 1.75 | 1.75 | 1.75 | 1.75 | 1.75 | 1.75 |
| TOTALS | 219.25 | 221.44 | 221.44 | 221.44 | 221.44 | 221.44 | 221.44 | 221.44 |
| MIXING TIME | 6 MIN. | 6 MIN. | 6 MIN. | 6 MIN. | 6 MIN. | 6 MIN. | 6 MIN. | 6 MIN. |
| DUMP TEMP | 265° F. | 265° F. | 255° F. | 255° F. | 250° F. | 255° F. | 270° F. | 255° F. |
| *ADD SULFUR ON MILL | * | * | | | | | * | |
| SCORCH @ 320° F. | 10 MIN. | 10 MIN. | 10 MIN. | 10 MIN. | 10 MIN. | 10 MIN. | 10 MIN. | 10 MIN. |
| 100% CURE @ 320° F. | 13 MIN. | 13 MIN. | 13 MIN. | 13 MIN. | 13 MIN. | 13 MIN. | 13 MIN. | 13 MIN. |
| TENSILE PSI | 2410 | 2410 | 2470 | 2490 | 2610 | 2490 | 2415 | 2500 |
| MODULUS @ 100% | 735 | 735 | 740 | 740 | 780 | 740 | 735 | 750 |
| ELONGATION % | 580 | 580 | 590 | 590 | 620 | 590 | 580 | 590 |
| SHORE A HARDNESS | 60 | 60 | 60 | 60 | 60 | 60 | 60 | 60 |
| MOONEY ML4 @ 212° F. | 62 | 61 | 58 | 57 | 49 | 57 | 62 | 55 |
| DIE "C" TEAR | 310 | 310 | 310 | 310 | 320 | 310 | 310 | 315 |
| MICROSCOPICAL DISPERSION SPECIAL STRETCH | GOOD | GOOD | GOOD | VERY GOOD | EXCELLENT | GOOD | GOOD | VERY GOOD |
| MICROSCOPICAL DISPERSION | FAIR | GOOD | VERY | EXCELLENT | EXCELLENT | VERY | FAIR | EXCEL- |

TABLE 1-continued

RESULTS OF RADIAL PASSENGER TIRE TREAD TEST.

| SAMPLES ADDED @ "1" MIN. AFTER RUBBER BREAKDOWN 40 RPM. ROTOR SPEED | CONTROL | SAMPLE No. 1 | SAMPLE No. 2 | SAMPLE No. 3 | SAMPLE No. 4 | SAMPLE No. 5 | SAMPLE No. 6 | SAMPLE No. 7 |
|---|---|---|---|---|---|---|---|---|
| INTERFERENCE WITH PAINT ON ADHESION | NONE | NONE | GOOD NONE | NONE | NONE | GOOD NONE | NONE | LENT NONE |
| ADHESION "1" STRIP | 20 LB. | 20 LB. | 20 LB. | 21 LB. | 21 LB. | 20 LB. | 20 LB. | 21 LB. |
| GRAMS TO RELEASE FROM MOLD | 42.60 | 42.63 | 42.90 | 39.40 | 38.10 | 40.32 | 42.70 | 39.00 |
| BLEED OUT OVEN 72 HOURS @ 182° F. | NONE | NONE | NONE | NONE | NONE | NONE | NONE | NONE |
| COMPRESSION SET ASTM D 395 METHOD B 1/2" DISC, 70 HRS. @ 212° F. | 14 | 14 | 12 | 12 | 10 | 12 | 14 | 12 |
| OXYGEN BOMB ASTM D 454 | 14 HRS CRACKS | 14 HRS CRACKS | 16 HRS CRACKS | 16 HRS CRACKS | 20 HRS CRACKS | 16 HRS CRACKS | 14 HRS CRACKS | 16 HRS CRACKS |
| OZONE TEST ASTM D 1148 | 16 HRS CRACKS | 16 HRS CRACKS | 18 HRS CRACKS | 18 HRS CRACKS | 22 HRS CRACKS | 18 HRS CRACKS | 16 HRS CRACKS | 18 HRS CRACKS |
| CURED FINISH 1–15 | 6 | 6 | 9 | 9 | 12 | 9 | 6 | 9 |
| CURED SHINE 1–15 | 7 | 7 | 9 | 9 | 13 | 9 | 7 | 9 |
| UNCURED BUILDING TACK | 54.00 | 54.00 | 55.20 | 56.00 | 57.80 | 55.25 | 54.00 | 56.00 |

TABLE 2

RESULTS OF RADIAL PASSENGER TIRE TREAD TEST.

| SAMPLES ADDED @ "1" MIN. AFTER RUBBER BREAKDOWN 40 RPM. ROTOR SPEED | CONTROL | SAMPLE NO. 1 | SAMPLE NO. 2 | SAMPLE NO. 3 | SAMPLE NO. 4 | SAMPLE NO. 5 | SAMPLE NO. 6 | SAMPLE NO. 7 |
|---|---|---|---|---|---|---|---|---|
| SBR-1712 | 82.50 | 82.50 | 82.50 | 82.50 | 82.50 | 82.50 | 82.50 | 82.50 |
| PBD-1252 | 55.00 | 55.00 | 55.00 | 55.00 | 55.00 | 55.00 | 55.00 | 55.00 |
| ISAF-HS-BLACK-N-234 | 70.00 | 70.00 | 70.00 | 70.00 | 70.00 | 70.00 | 70.00 | 70.00 |
| STEARIC ACID | 2.00 | 2.00 | 2.00 | 2.00 | 2.00 | 2.00 | 2.00 | 2.00 |
| SUNOLITE 240 | 4.00 | 4.00 | 4.00 | 4.00 | 4.00 | 4.00 | 4.00 | 4.00 |
| ZINC OXIDE | 3.00 | 3.00 | 3.00 | 3.00 | 3.00 | 3.00 | 3.00 | 3.00 |
| SAMPLE #1 | | 4.38 | | | | | | |
| SAMPLE #2 | | | 4.38 | | | | | |
| SAMPLE #3 | | | | 4.38 | | | | |
| SAMPLE #4 | | | | | 4.38 | | | |
| SAMPLE #5 | | | | | | 4.38 | | |
| SAMPLE #6 | | | | | | | 4.38 | |
| SAMPLE #7 | | | | | | | | 4.38 |
| DUREX | 1.00 | 1.00 | 1.00 | 1.00 | 1.00 | 1.00 | 1.00 | 1.00 |
| R.M. SULFUR | 1.75 | 1.75 | 1.75 | 1.75 | 1.75 | 1.75 | 1.75 | 1.75 |
| TOTALS | 219.25 | 219.25 | 219.25 | 219.25 | 219.25 | 219.25 | 219.25 | 219.25 |
| MIXING TIME | 6 MIN. | 6 MIN. | 6 MIN. | 6 MIN. | 6 MIN. | 6 MIN. | 6 MIN. | 6 MIN. |
| DUMP TEMP | 265° F. | 260° F. | 250° F. | 250° F. | 245° F. | 250° F. | 260° F. | 250° F. |
| *ADD SULFUR ON MILL | * | * | | | | | * | |
| SCORCH @ 320° F. | 10 MIN. | 10 MIN. | 10 MIN. | 10 MIN. | 10 MIN. | 10 MIN. | 10 MIN. | 10 MIN. |
| 100% CURE @ 320° F. | 13 MIN. | 13 MIN. | 13 MIN. | 13 MIN. | 13 MIN. | 13 MIN. | 13 MIN. | 13 MIN. |
| TENSILE PSI | 2410 | 2490 | 2590 | 2600 | 2630 | 2590 | 2490 | 2600 |
| MODULUS @ 100% | 735 | 740 | 770 | 770 | 790 | 770 | 740 | 770 |
| ELONGATION | 580 | 590 | 600 | 660 | 625 | 600 | 590 | 600 |
| SHORE A HARDNESS | 60 | 60 | 60 | 60 | 60 | 60 | 60 | 60 |
| MOONEY ML4 @ 212° F. | 62 | 57 | 55 | 54 | 44 | 55 | 57 | 54 |
| DIE "C" TEAR | 310 | 310 | 315 | 315 | 330 | 315 | 310 | 315 |
| MICROSCOPICAL DISPERSION SPCIAL STRETCH | GOOD | VERY GOOD | VERY GOOD | VERY GOOD | EXCELLENT | VERY GOOD | VERY GOOD | VERY GOOD |
| MICROSCOPICAL DISPERSION | GOOD | VERY GOOD | EXCELLENT | EXCELLENT | EXCELLENT | EXCELLENT | VERY GOOD | EXCELLENT |
| INTERFERENCE WITH PAINT ON ADHESION | NONE | NONE | NONE | NONE | NONE | NONE | NONE | NONE |
| ADHESION 1" STRIP | 20 LB. | 20 LB. | 20 LB. | 21 LB. | 21 LB. | 20 LB. | 20 LB. | 21 LB. |
| GRAMS TO RELEASE FROM MOLD | 42.60 | 39.50 | 40.38 | 39.00 | 37.60 | 40.30 | 39.70 | 39.00 |
| BLEED OUT OVEN 72 HOURS @ 182° F. | NONE | NONE | NONE | NONE | NONE | NONE | NONE | NONE |
| COMPRESSION SET ASTM D 395 METHOD B ½" DISC, 70 HRS. @ 212° F. | 13 | 12 | 12 | 11 | 10 | 12 | 12 | 11 |
| OXYGEN BOMB ASTM D 454 | 14 HRS CRACKS | 16 HRS CRACKS | 16 HRS CRACKS | 17 HRS CRACKS | 20 HRS CRACKS | 16 HRS CRACKS | 16 HRS CRACKS | 16 HRS CRACKS |

TABLE 2-continued

RESULTS OF RADIAL PASSENGER TIRE TREAD TEST.

| SAMPLES ADDED @ "1" MIN. AFTER RUBBER BREAKDOWN 40 RPM. ROTOR SPEED | CONTROL | SAMPLE NO. 1 | SAMPLE NO. 2 | SAMPLE NO. 3 | SAMPLE NO. 4 | SAMPLE NO. 5. | SAMPLE NO. 6 | SAMPLE NO. 7 |
|---|---|---|---|---|---|---|---|---|
| OZONE TEST ASTM D 1148 | 16 HRS CRACKS | 18 HRS CRACKS | 18 HRS CRACKS | 19 HRS CRACKS | 22 HRS CRACKS | 18 HRS CRACKS | 18 HRS CRACKS | 16 HRS CRACKS |
| CURED FINISH 1–15 | 6 | 9 | 9 | 9 | 13 | 9 | 9 | 9 |
| CURED SHINE 1–15 | 7 | 9 | 9 | 9 | 14 | 9 | 9 | 9 |
| UNCURED BUILDING TACK | 54.00 | 56.00 | 56.40 | 56.00 | 58.40 | 56.40 | 56.90 | 56.00 |

From the data set forth in Tables 1 and 2, it can be seen that Sample 1, which contained no peptizing agent, provided little or no improvement in processability or cured properties in the radial passenger tire tread compound, whereas samples containing both a silicone lubricant and a peptizing agent generally improved mixing, as evidenced by reduced Mooney viscosity and dump temperature, and improved physical and chemical properties of the vulcanized rubber.

For example, the rubbers in accordance with the invention exhibited greater resistance to oxygen and ozone degradation than the control. On the average, the rubber in accordance with the invention also exhibited better releasibility (as measured by the number of grams to release it from the mold) than the control.

It can also be seen from the results reported in Tables 1 and 2 that the physical properties of the seven rubber samples were not adversely affected, and in some cases were improved, notwithstanding the fact that they were formulated with a general purpose silicone lubricant. In fact, it was surprising to discover that, on the average, the tensile strength modulus, elongation and adhesion of the rubber samples in accordance with the invention were actually better than the corresponding properties in the control.

Sample 4 afforded the best results in these tests.

EXAMPLE 2

Processing Aid For Elastomers

A processing aid suitable for use with elastomers was prepared by adding dodecylbenzene sulfonic acid and a silicone resin to X-100, which was prepared in the same manner as described in Example 1.

15 parts of the X-100™ were added to a kettle and heated to a temperature of about 220°–230° F., whereupon 10 parts of mink wax, 15 parts of cetyl alcohol, 15 parts of stearamide and 5 parts of FC-430™, a fluorosurfactant commercially available from 3M company, were added with stirring. The resulting mixture was then cooled to about 190°–200° F., and 15 parts of SF-1080, an amine terminated proprietary silicone resin referred to in the trade as a methylalkyl silicone resin, available from General Electric Co. and 15 parts of dodecylbenzene sulfonic acid were added with stirring. The resulting mixture was stirred for one hour, with evolution of heat, at a temperature of 220° F. The mixture was then cooled, removed from the kettle and sprayed onto 10 parts of powdered silica having a partical size of 2 to 5 microns, thus forming a dry, free-flowing powder.

EXAMPLE 3

Processing Aid For Elastomers

Employing procedures similar to those described in Example 2, a processing aid suitable for use with elastomers was prepared by adding 10 parts of mink wax, 15 parts of cetyl alcohol, 15 parts of stearamide, and 4 parts of FC-430™ fluorosurfactant to 15 parts of X-100™. The resulting mixture was cooled to about 190°–200° F., and 4 parts of SF-1080 methylalkyl silicone resin and 15 parts of dodecylbenzene sulfonic acid were added. The mixture was held with stirring, for one hour at 220° F. with the evolution of heat. The resulting mixture was cooled and sprayed onto 22 parts of a mixture of 6 parts of silica, having a particle size of 2.5 microns, and 16 parts of clay, having a particle size of less than 2 microns, thus, forming a dry, free-flowing powder.

EXAMPLE 4

Processing Aid for Elastomers and Plastics

A processing aid suitable for use with both elastomers and plastics was prepared by mixing 31.75 parts of a dimer acid resin, 4 parts of SF-1080 methylalkyl silicone resin, 5.75 parts of FSO™ fluorosurfactant, 10.75 parts of octyl isononanoate, 5.75 parts of mink oil, 5.75 parts of Pluronic L-62™ [a poly(oxyethylene-co-oxypropylene) nonionic surfactant available from BASF Wyandotte Corp.], 5.75 parts of isopropyl palmitate, 13.75 parts of propylene glycol, and 7.75 parts of nonylphenoxytridecyl ethylene glycol. The dimer acid resin was prepared by mixing 5.36 parts of dodecylbenzene sulfonic acid, 21.45 parts of a dimer of stearic and oleic acids, 6.44 parts of isopropyl palmitate, and 2.5 parts of triethanolamine in a kettle and heating the mixture at about 190° for about 1 hour. The resulting mixture was sprayed onto 22 parts of a mixture of 6 parts of silica and 16 parts of clay, thus, forming a dry, free-flowing powder.

EXAMPLE 5

Processing Aid for Elastomers

The pH of the processing aid produced as described in Example 4 was lowered to about 3 by adding dodecylbenzene sulfonic acid before it was sprayed onto the silica clay carrier, to provide a processing aid which imparts lower viscosity, better wetting, and better dispersion to elastomers.

EXAMPLE 6

Processing Aid for Elastomers

Employing procedures similar to those described in Example 1, three sample processing aids of this invention (Samples 8–10) were prepared by adding 7.5 parts of mink wax, 7 parts of stearamide, 16 parts of cetyl alcohol, 5 parts of Zonyl FSN™ fluorosurfactant, 7 parts of polyethylene wax, and 16 parts of zinc stearate to 5.5 parts of X-100. Next, dodecylbenzene sulfonic acid and SF-1080 silicone resin were added, and the mixture was stirred for one hour at 220° F. with evolution of heat. The resulting mixture was sprayed onto 30 parts of powdered silica having a partical size of 2 to 5 microns, thus forming a dry, free-flowing powder.

The amounts of dodecylbenzene sulfonic acid, SF-1080, and silica were:

| | Sample | | |
|---|---|---|---|
| Component | 8 | 9 | 10 |
| Dodecylbenzene sulfonic acid | 4 | 8 | 12 |
| SF-1080 | 2 | 4 | 6 |
| SiO$_2$ | 30 | 24 | 18 |

Next, 1.74 g of each of the resulting processing aids was added to separate portions of a rubber compound comprising 30 g of standard Malaysian rubber, 10 g of PBD-1228™ (a polybutadiene rubber available from Firestone Co. which consists of an oil/rubber formula with 8 parts carbon black per 92 parts rubber), 55 g of SBR-1551™ (a styrene-butadiene rubber available from Goodyear Co. which consists of 6 parts oil per 94 parts rubber), 1.25 g of stearic acid, 9 g of a processor/extender (Sundex™, available from Sun Chemical Corp.), 5 g of zinc oxide, 3 g of sulfur, and 0.7 g of an accelerator for the sulfur (Santocure™, available from Monsanto). The resulting compositions were mixed until homogenous compositions were achieved, the rubber compositions were vulcanized and physical properties of the compounds were determined and are reported in Table 3.

Employing procedures and formulations similar to those described above, a series of three comparative samples (Samples A, B and C) was prepared in which the dodecylbenzene sulfonic acid, the SF-1080 silicone, or both, were omitted.

The amounts of dodecylbenzene sulfonic acid, SF-1080 and silica used in each comparative sample were as follows:

| | Comparative Sample | | |
|---|---|---|---|
| Component | A | B | C |
| Dodecylbenzene sulfonic acid | 0 | 4 | 0 |
| SF-1080 | 6 | 0 | 0 |
| Silica | 30 | 32 | 36 |

1.74-g portions of the resultant compositions were added to the rubber compound identified above, mixed until a homogeneous composition was achieved, and vulcanized. The physical properties of the resultant rubber compositions, were then determined, and are reported in Table 3.

TABLE 3

| | Samples of Invention | | | Comparative Samples | | | Control* |
|---|---|---|---|---|---|---|---|
| | | | | A [No silicone] | B [No peptizer] | C [No silicone or Peptizer] | |
| Test | 8 | 9 | 10 | | | | |
| Process Condition: | | | | | | | |
| Mix Time, min | 8 | 9 | 9 | 8 | 8 | 9 | 9 |
| Dump Temp, °C. | 245 | 240 | 245 | 255 | 245 | 245 | 290 |
| Property: | | | | | | | |
| Scorch at 320° F., min | 8 | 8 | 8 | 7 | 8 | 8 | 8 |
| 100% Cure at 320° F., min | 11 | 11 | 11 | 10 | 11 | 11 | 11 |
| Tensile, psi | 3780 | 4010 | 4010 | 3780 | 3790 | 3790 | 3780 |
| Modulus @ 100%, psi | 395 | 410 | 410 | 395 | 400 | 400 | 375 |
| Elongation, % | 505 | 525 | 525 | 500 | 505 | 505 | 500 |
| Shore A Hardness | 66 | 65 | 65 | 66 | 66 | 66 | 66 |
| Mooney Viscosity | 45 | 40 | 40 | 55 | 47 | 48 | 55 |
| Dispersion** | very good | excellent | excellent | good | very good | very good | good |
| Die C Tear | 295 | 320 | 320 | 295 | 300 | 300 | 275 |
| Release from Mold, gm. | 3360 | 3090 | 3095 | 4790 | 3880 | 3912 | 4782 |
| Cured Finish (1–10) | 8 | 10 | 10 | 5 | 8 | 7 | 5 |
| Shine (1–10) | 8 | 10 | 10 | 6 | 6 | 6 | 5 |
| Adhesion, 1" strip, lb. | 22 | 23 | 23 | 19 | 21 | 20 | 20 |
| Uncured Building Tack, Light Wipe With Solvent, gm. | 5240 | 6340 | 6350 | 4960 | 5510 | 5100 | 4900 |
| Compression Set, %*** | 11 | 8 | 7 | 14 | 13 | 13 | 15 |
| Oxygen Bomb, **** hr. | 13 | 17 | 17 | 11 | 12 | 11 | 10 |
| Ozone Test,***** hr. | 14 | 20 | 21 | 13 | 13 | 13 | 12 |

*Control was rubber formulation alone without any processing aid.
**Determined microscopically.
***ASTM D 395
****ASTM D 454
*****ASTM D 1148

The results obtained using the processing aids of the invention (Samples 8–10) demonstrate that the addition of the processing aid of the present invention to a rubber compound improves its processability, adhesion, tack and physical properties.

Samples 9 and 10, which included processing aids having the greatest amounts of dodecylbenzene sulfonic acid and silicone lubricant, provided the best results. Tensile strength, elongation, building tack, adhesion, release, finish and shine are improved over the results obtained with Sample 8. Comparative Sample C, without either peptizer or silicone, provided modest improvements in properties over the Control Comparative Sample B, with silicone but no peptizer, afforded no significant improvement over Comparative Sample C. Control Sample A, with peptizer but no silicone, gave properties which were essentially similar to those of the Control, and were poorer than those obtained with Samples B or C.

EXAMPLE 7

A processing aid according to this invention was prepared by mixing 12 parts of dodecylbenzene sulfonic acid and 5 parts of SF-1080 silicone lubricant, and heating at 190°–200° F., with stirring for one hour, with evolution of heat, causing the temperature to rise to 220° F. The resulting product was then sprayed onto 83 parts of clay having a particle size of 2 to 5 microns, to form a dry, free-flowing powder. This processing aid was then employed in an EPDM cable insulation compound containing 100.00 parts Royalene-512 EPDM, 1.00 parts stearic acid, 5.00 parts zinc oxide, 200.00 parts hard clay, 65.00 parts Sunpar-2280 an extender, oil commercially-available from Sun Oil Co., 3.00 parts mercaptobenzothiazole, 1.00 parts Butazate, a secondary accelerator sold by R. T. Vanderbilt Co., 0.70 parts Tuex, an accelerator sold by R. T. Vanderbilt Co., 0.75 parts sulfur and 3.76 parts of the processing aid.

The compound was prepared by mixing the ingredients in a Banbury mixer at 40 RPM rotor speed, followed by a rubber mill. The processing aid was added two minutes before dumping the batch, while sulfur was added on the mill, and then vulcanized. For purposes of comparison, three other compounds were prepared: (1) a control with no processing aid; (2) a Comparison Sample D with 3.76 parts of dodecylbenzene sulfonic acid but no silicone resin sprayed onto clay; and (3) a Comparison Sample E with 3.76 parts of silicone resin but no dodecylbenzene sulfonic acid sprayed onto clay. The process conditions and properties of the resulting vulcanized compounds are summarized in Table 4.

TABLE 4

| Test | Example 7 | Comparison Samples D [No silicone] | Comparison Samples E [No peptizer] | Control |
|---|---|---|---|---|
| Process Conditions: | | | | |
| Mixing Time, min. | 8 | 8 | 7 | 8 |
| Dump Temp., °F. | 245 | 250 | 245 | 280 |
| Property: | | | | |
| Scorch at 320° F., min. | 7 | 7 | 7 | 7 |
| 100% Cure at 320° F., min. | 10 | 10 | 10 | 10 |
| Tensile, psi | 950 | 855 | 855 | 850 |
| Modulus at 100%, psi | 410 | 400 | 400 | 400 |

TABLE 4-continued

| Test | Example 7 | Comparison Samples D [No silicone] | Comparison Samples E [No peptizer] | Control |
|---|---|---|---|---|
| Elongation, % | 800 | 790 | 790 | 785 |
| Shore A Hardness | 60 | 60 | 60 | 60 |
| Mooney (ML4) at 212° F. | 50 | 52 | 51 | 59 |
| Die "C" Tear | 310 | 300 | 300 | 300 |
| Microscopic Dispersion | Excellent | Very Good | Excellent | Poor |
| Interference with Paint Adhesion | None | None | None | None |
| Adhesion, 1" Strip, lb. | 16 | 15 | 16 | 15 |
| Mold Release, gm. | 3910 | 4850 | 4420 | 5052 |
| Bleed Out, 72 hr. at 182° F. | None | None | None | None |
| Compression Set* | 12 | 13 | 14 | 17 |
| Oxygen Bomb,** time to crack, hr. | >72 | >72 | >72 | >72 |
| Ozone Test,*** time to crack, hr. | >72 | >72 | >72 | >72 |
| Cured Finish (1–15) | 14 | 7 | 13 | 3 |
| Cured Rubber Shine (1–15) | 14 | 7 | 13 | 3 |
| Uncured Building Tack, Light Wipe With Solvent, gm. | 4910 | 4360 | 4890 | 3675 |

*ASTM D-395 - Method B, ½" Disc, 70 hours at 212° F.
**ASTM D-454.
***ASTM D-1148.

From the foregoing, it can be seen that the processing aid of this invention imparted significantly greater improvement to the properties of the EPDM rubber insulation compound than either of its two ingredients. Surprisingly, dodecylbenzene sulfonic acid (Comparison Sample D), which heretofore has been added to rubber in salt form, was found to be effective alone as a processing aid. In particular, it significantly reduced Mooney viscosity and mold release characteristics of the compound.

EXAMPLE 8

The processing aid of Example 7 was also evaluated in the rubber compound described in Example 6, using 1.75 parts by weight of the processing aid. For purposes of comparison, three other compounds were prepared: (1) a control with no processing aid; (2) a Comparison Sample F with 1.75 parts by weight of dodecylbenzene sulfonic acid but no silicone resin on clay; and (3) a Comparison Sample G with 1.75 parts by weight of silicone resin but no dodecylbenzene sulfonic acid on clay. The results are summarized in Table 5.

TABLE 5

| Test | Example 7 | Comparison Samples F | Comparison Samples G | Control |
|---|---|---|---|---|
| Process Conditions: | | | | |
| Mixing Time, min. | 9 | 9 | 9 | 9 |
| Dump Temp., °F. | 245 | 255 | 250 | 290 |
| Properties: | | | | |
| Scorch at 320° F., min. | 8 | 8 | 8 | 8 |
| 100% Cure at 320° F., min. | 11 | 11 | 11 | 11 |
| Tensile, psi | 4010 | 3795 | 4000 | 3730 |
| Modulus at 100%, psi | 410 | 400 | 400 | 395 |
| Elongation, % | 520 | 500 | 500 | 500 |
| Shore A Hardness | 66 | 66 | 66 | 66 |

TABLE 5-continued

| Test | Example 7 | Comparison Samples F | G | Control |
|---|---|---|---|---|
| Mooney (ML4) at 212° F. | 47 | 51 | 51 | 51 |
| Die "C" Tear | 320 | 295 | 300 | 295 |
| Microscopic Dispersion | Excellent | Very good | Very good | Good |
| Interference With Paint Adhesion | None | None | None | None |
| Adhesion, 1" Strip, lb. | 21 | 20 | 20 | 20 |
| Mold Release, gm. | 4010 | 4660 | 4645 | 4990 |
| Bleed Out, 72 hr. at 182 F. | None | None | None | None |
| Compression Set | 13 | 14 | 14 | 15 |
| Oxygen Bomb, hr. | 16 | 10 | 10 | 10 |
| Ozone Test, hr. | 18 | 12 | 12 | 12 |
| Cured Finish (1–15) | 14 | 6 | 13 | 5 |
| Cured Rubber Shine (1–15) | 14 | 6 | 13 | 5 |
| Uncured Building Tack, Light Wipe With Solvent, gm. | 5860 | 5010 | 5034 | 4965 |

Once again, the processing aid of this invention achieved a greater improvement in properties when compared with either of its ingredients. Also once again, the blend of dodecylbenzene sulfonic acid and silicone fluid surprisingly demonstrated utility as a processing aid.

As is apparent from Examples 7 and 8, the blend of dodecylbenzene sulfonic acid and silicone fluid has utility as a processing aid, causing substantial reduction in Mooney viscosity and improving dispersion of the rubber compound. This was a very surprising discovery because heretofore alkylbenzene sulfonic acids have not been added in acid form. Rather, they had been added as salts, e.g., alkali metal or amine salts. It was assumed that only salts could be used because the free acid would be unsafe, and cause corrosion to processing equipment.

The use of free dodecylbenzene sulfonic acid or other alkylbenzene sulfonic acid is therefore a practical alternative to the use of salts. It is believed that the mechanism by which the viscosity of rubber is lowered by dodecylbenzene sulfonic acid is due to its capacity to attack and split rubber bonds, as well as its capacity to act as a plasticizer. Its plasticizing and lubricating effect is demonstrated by reduced values for grams necessary to release the rubber from the mold, surface appearance, etc., compared with the control.

When compared with the partially neutralized acid of the prior art, the unmodified acid shows higher activity in breaking down the rubber.

Whatever the mechanism, however, processing and physical properties are improved by the use of free alkylbenzene sulfonic acid, e.g., dodecylbenzene sulfonic acid in an amount that ranges from about 3 to about 25 parts by weight per hundred parts of rubber compound. Similar and related acids within the scope of formula (I) are equally effective.

EXAMPLE 9

The effects of three different silicone fluids on rubber compounds were compared to the effects of the same silicone fluids used in conjunction with a peptizing agent in accordance with the invention. Comparative Sample H was a methylalkyl silicone fluid (Silicone SF-1080 from General Electric). Comparative Sample I was a polydimethylsiloxane (molecular weight of 10,000) (Viscasil 10M from General Electric), while Comparative Sample J was a polydimethylsiloxane (molecular weight of 100,000) (Viscasil 30M from General Electric).

Samples Nos. 11–13 were based on the following base formula:

```
5.5 Parts X-100 ™
7.5 Parts Mink Wax
7 Parts Stearamide
16 Parts Cetyl Alcohol
5 Parts Zonyl FSN (Fluorosurfactant)
7 Parts Polyethylene Wax
```

The X-100 was prepared described as in Example 1. Sample No. 11 also included a processing aid comprising a mixture of Silicone SF-1080 lubricant, dodecylbenzene sulfonic acid, plasticizers and surfactants. Sample No. 12 included a mixture of Viscasil 10M, peptizers, plasticizers and surfactants. Sample No. 13 included a mixture of polydimethylsiloxanes (Viscasil 30M), peptizers, plasticizers and surfactants. The results are reported in the following Table 6.

TABLE 6

| 40 RPM. ROTOR SPEED | Comparative Samples CONTROL | H | I | J | SAMPLE No. 11 | SAMPLE No. 12 | SAMPLE No. 13 |
|---|---|---|---|---|---|---|---|
| SMR-20 | 3000 | 3000 | 3000 | 3000 | 3000 | 3000 | 3000 |
| PBD-1228 | 1000 | 1000 | 1000 | 1000 | 1000 | 1000 | 1000 |
| SBR-1551 | 5500 | 5500 | 5500 | 5500 | 5500 | 5500 | 5500 |
| N-339HAF-HM-BLACK | 6000 | 6000 | 6000 | 6000 | 6000 | 6000 | 6000 |
| STEARIC ACID | 125 | 125 | 125 | 125 | 125 | 125 | 125 |
| SUNDEX-790 | 900 | 900 | 900 | 900 | 900 | 900 | 900 |
| ZINC OXIDE | 500 | 500 | 500 | 500 | 500 | 500 | 500 |
| SAMPLE #1 | | 174 | | | | | |
| SAMPLE #2 | | | 174 | | | | |
| SAMPLE #3 | | | | 174 | | | |
| SAMPLE #4 | | | | | 174 | | |
| SAMPLE #5 | | | | | | 174 | |
| SAMPLE #6 | | | | | | | 174 |
| SAMPLE #7 | | | | | | | |
| SANTO CURE | 070 | 070 | 070 | 070 | 070 | 070 | 070 |
| R,M-SULFUR | 300 | 300 | 300 | 300 | 300 | 300 | 300 |
| TOTALS | 17395 | 17569 | 17569 | 17569 | 17569 | 17569 | 17569 |
| MIXING TIME | 9 MIN. | 8 MIN. | 9 MIN. | 9 MIN. | 9 MIN. | 8 MIN. | 9 MIN. |

TABLE 6-continued

Comparative Samples

| 40 RPM. ROTOR SPEED | CONTROL | H | I | J | SAMPLE No. 11 | SAMPLE No. 12 | SAMPLE No. 13 |
|---|---|---|---|---|---|---|---|
| DUMP TEMP. | 290° F. | 250° F. | 260° F. | 260° F. | 250° F. | 240° F. | 240° F. |
| * = ADD SULFUR ON MILL | * | * | * | * | * | * | * |
| SCORCH @ 320° F. | 8 MIN. | 7 MIN. | 8 MIN. | 8 MIN. | 7 MIN. | 7 MIN. | 8 MIN. |
| 100% CURE @ 320° F. | 11 MIN. | 11 MIN. | 11 MIN. | 11 MIN. | 11 MIN. | 11 MIN. | 11 MIN. |
| TENSILE PSI | 3780 | 3790 | 3790 | 3800 | 4200 | 4350 | 4325 |
| MODULES @ 100% | 390 | 400 | 400 | 410 | 440 | 460 | 460 |
| ELONGATION % | 500 | 510 | 510 | 510 | 550 | 555 | 555 |
| DIE "C" TEAR | 290 | 295 | 295 | 295 | 330 | 340 | 335 |
| SHORE A HARDNESS | 66 | 66 | 66 | 66 | 66 | 66 | 66 |
| MOONEY ML4C 212° F. | 58 | 53 | 53 | 53 | 38 | 35 | 35 |
| MICROSCOPICAL DISPERSION | GOOD | VERY GOOD | VERY GOOD | VERY GOOD | EXCELLENT | EXCELLENT | EXCELLENT |
| SPECIAL STRETCH | | | | | | | |
| MICROSCOPICAL DISPERSION | GOOD | VERY GOOD | VERY GOOD | VERY GOOD | EXCELLENT | EXCELLENT | EXCELLENT |
| INTERFERENCE WITH PAINT | NONE | NONE | NONE | NONE | NONE | NONE | NONE |
| ON ADHESION | | | | | | | |
| ADHESION 1" STRIP | 21 LB. | 20 LB. | 19 LB. | 20 LB. | 24 LB. | 25 LB. | 25 LB. |
| GRAMS TO RELEASE FROM MOLD | 5060 | 4868 | 5860 | 4840 | 2900 | 2800 | 2850 |
| BLEED OUT OVEN 72 HRS, C 182° F. | NONE | NONE | NONE | NONE | NONE | NONE | NONE |
| COMPRESSION SET-ASTM-D-395 MEHTOD B, ½" DISC. 70 HRS C 212° F. | 16 | 15 | 15 | 15 | 7 | 12 | 15 |
| OXYGEN BOMB-ASTM-D-454 (HRS CRACKS) | 10 | 24 | 28 | 28 | 30 | 31 | 33 |
| OZONE TEST, ASTM-D-1148 (HRS CRACKS) | 12 | 34 | 30 | 30 | 31 | 33 | 35 |
| CURED FINISH, 1 TO 15 | 6 | 9 | 9 | 9 | 14 | 14 | 14 |
| CURED RUBBER SHINE 1 TO 15 | 9 | 9 | 9 | 9 | 14 | 14 | 14 |
| UNCURED BUILDING TACT | | | | | | | |

It can be seen from the results that the three rubbers treated with the processing aids of the invention (i.e., Samples 11–13) exhibited much better dispersion than the Control and the other samples. In addition, the rubbers in accordance with the invention exhibited greater resistance to oxygen and ozone degradation than the other samples. On the average, the rubber in accordance with the invention also exhibited better releasability (as measured by the number of grams to release it from the mold) than the other samples. Furthermore, it can be seen that the processing aid of the invention reduced the Mooney viscosity of the rubber samples thereby facilitating mixing and processing.

It can also be seen from the results reported in the table that the physical properties of the three rubber samples (Nos. 11–13) were not adversely affected, notwithstanding the fact that they were formulated with a silicone lubricant. In fact, it was surprising to discover that, on the average, the tensile strength, modulus, elongation percent and adhesion of the rubber samples in accordance with the invention were actually better than the corresponding properties in the control.

EXAMPLE 10

Three-Component Processing Aid (Paste Form)

A paste form of the three-component processing aid of this invention (Processing Aid A) was prepared by adding to a stirred tank heated at 150°–190° F., in sequence, 28 parts of petrolatum, 25 parts of Z-90, 1 part of isopropyl myristate, 19 parts of dodecylbenzene sulfonic acid, 10 parts of Silwet L-7602, 2 parts of SF-1080, 3 parts of paraffin wax, and 2 parts of Silwet L-77, and stirring until a uniform blend was obtained.

A 1.74-gram portion of the processing aid was incorporated into a tire-tread compound formed from 30 grams of SMR-20 rubber (smoked natural rubber), 10 grams of PBD-1228 polybutadiene rubber, 55 grams of SBR-1551 styrene-butadiene rubber, 60 grams of carbon black, 1.25 grams of stearic acid, 9.00 grams of Sundex 990 rubber extender, 5.0 grams of zinc oxide, 0.70 grams of Santocure vulcanization accelerator and 3.0 grms of rubber makers sulfur, and the compound was vulcanized. A control formulation was prepared without the processing aid, and vulcanized. Properties of the cured compounds were:

| Property | Example 10 | Control |
|---|---|---|
| Mooney ML4C 212° F. | 43 | 54 |
| Tensile, psi. | 4000 | 3785 |
| Modulus @ 100%, psi. | 410 | 395 |
| Elongation, % | 520 | 500 |
| Oxygen Test ASTM D-45, hr. | 17 | 9 |
| Ozone Test ASTM D-148, hr. | 20 | 12 |
| Mold Release, gm. | 3000 | 4790 |

EXAMPLE 11

Three-Component Processing Aid (Powder Form)

A powdered form of the three-component processing aid of this invention (Processing Aid B) was prepared by adding 22 parts of silicon dioxide powder and 25 parts clay powder (particle size ?) to a ribbon blender, mixing for about 5 minutes until a uniform powder blend was formed, then, over a period of about 30 minutes, spraying onto the powder (while still mixing), in sequence, 10 parts of dimethyl siloxane lubricant sold by General Electric Co. as F-1080, 10 parts of a dimethyl silicon copolymer having pendant polyester groups sold by Union Carbide Corp as SILWET™ Copolymer L-7602 surfactant, 10 parts of dodecylbenzene sulfonic acid, 18 parts of a proprietary blend of Technical Processing, Inc. identified as Z-90 (Z-90 is a mixture of 55 parts of oleic acid, 20 parts of petrolatum, 5 parts of zinc oxide, and 20 parts of isopropyl myristate), 2 parts of a dimethyl silicone copolymer having pendant polyester groups sold by Union Carbide Corp. as SILWET™ Copolymer L-77 wetting agent, and finally adding 3 parts of powdered pentachlorothiophenyl. Mixing continued for an additional 2.5 minutes until a uniform composition was obtained.

EXAMPLE 12

Use of Three-Component Processing Aid in EPDM Automotive Bumper Strip Compound

A control EPDM (ethylene-propylene-diene rubber) automotive bumper strip compound was prepared by mixing on a No. 11 size banbury mixer, at a rotor speed of 40 rpm, 50 parts of EPSYN 40-A EPDM rubber sold by Copolymer, 50 parts EPSYN 5508 EPDM rubber sold by Copolymer, 180 parts of carbon black, 80 parts of Circosol-4240 (a processing aid sold by Sun Oil Co.), 1 part of stearic acid, 5 parts of zinc oxide, 1.50 parts of benzothiazole disulfide (Captax sold by R. T. Vanderbilt Co.), 0.75 part of mercaptobenzothiazole (Methyl Tuads sold by R. T. Vanderbilt Co.), 0.75 parts of Sulfads (a vulcanization accelerator sold by R. T. Vanderbilt Co.), 0.75 parts of tellurium diethyldithiocarbamate (Ethyl Tellurac supplied by R. T. Vanderbilt Co.), and 1 part of rubber maker's sulfur. Mixing was carried out for 7 minutes to a dump temperature of 265° F. (129.4° C. ). The resulting compound was then placed in a mold and vulcanized by heating at 300° F. (148.9° C. ), with 100 percent cure occurring after 10 minutes.

The foregoing procedure was repeated, except that 3.71 parts of powdered Processing Aid D were added to the compound 2 minutes before dumping the batch. Mixing time was reduced to 6 minutes and the dump temperature was reduced to 240° F. (155.6° C. ). One portion of the resulting compound was vulcanized at 300° F. and 100% cure was effected in only 8 minutes, a reduction in cure time of 20percent. A second portion of the compound was stored for 24 hours at ambient conditions and then vulcanized at 300° F. Again, 100 percent cure was effected in only 8 minutes.

Other properties of the rubber compounds and vulcanized rubbers were:

|  | EPDM Rubber | | |
| --- | --- | --- | --- |
|  | Control | With Aid B | |
| Property | (No Process Aid) | Immediate | 24 Hour |
| Mooney Viscosity (ML-4 @ 212° F.) | 55 | 51 | 50 |
| Scorch @ 300° F., min. | 5 | 5 | 5 |
| Tensile, psi. | 1735 | 1770 | 1770 |
| Modulus @ 100%, psi. | 650 | 665 | 665 |
| Elongation, % | 300 | 310 | 310 |
| Die "C" Tear | 290 | 300 | 300 |
| Shore A Hardness | 71 | 71 | 71 |
| Cured Finish (1–15) | 8 | 13 | 13 |
| Cured Shine (1–15) | 9 | 14 | 14 |

As can be seen from the foregoing data, the three-component powdered Processing Aid B of this invention effectively decreased the Mooney viscosity of the compound, caused a 20 percent reduction in cure time, without affecting scorch time and caused improvements in tensile strength, modulus, elongation, tear strength, cured finish and cured shine of the vulcanized rubber. No significant change in properties occurred after storing the rubber compound for 24 hours and then vulcanizing.

EXAMPLE 13

Use of Three-Component Processing Aid in Molded Diaphragm Nitrile Rubber Compound Employing apparatus and procedures similar to those described in Example 12, a molded diaphragm nitrile rubber compound was prepared from 100 parts Paracryl Ozo nitrile rubber sold by Uniroyal, 50 parts powdered carbon black, 20 parts dioctyl phthalate, 1 part stearic acid, 3 parts zinc oxide, 1.5 amine antioxidant (Agerite Stalite S sold by R. T. Vanderbilt Co.), 0.25 tetramethylthiuram mono-sulfide (Unads sold by R. T. Vanderbilt Co.), 1.25 parts benzothiazyldisulfide (Altax sold by R. T. Vanderbilt Co.) and 1.75 parts rubber maker's sulfur. Mixing time was 7 minutes to a dump temperature of 270° F. (132.2° C. ).

A second compound was made which also contained 1.8 parts of powdered Processing Aid B, added 2 minutes before dumping the batch. Mixing time was reduced to 6 minutes and the dump temperature was reduced to 245° F. (118.3° C.).

Vulcanization of both compounds was effected at 300° F. The 100 percent cure time for the control compound was 20 minutes, while that for the compound with Process Aid B was only 17 minutes, a 15 percent reduction in cure time. Properties of the compounds and cured rubbers were as follows:

|  | Nitrile Rubber | | |
| --- | --- | --- | --- |
|  |  | With Aid B | |
| Property | Control | Immediate | 24 Hour |
| Mooney Viscosity | 48 | 36 | 36 |
| Scorch @ 300° F., min. | 12 | 12 | 12 |
| Tensile, psi. | 2080 | 2095 | 2095 |
| Modulus @ 100%, psi. | 390 | 410 | 410 |
| Elongation, % | 430 | 440 | 440 |
| Die "C" Tear | 280 | 285 | 285 |
| Shore A Hardness | 72 | 72 | 72 |
| Cured Finish (1–15) | 8 | 11 | 11 |
| Cured Shine (1–15) | 6 | 13 | 13 |

The powdered Processing Aid B of this invention decreased Mooney viscosity of the compound, reduced mixing time by 15 percent without affecting scorch time, and improved tensile strength, modulus, elongation, tear strength, cured finish and cured shine of the vulcanized nitrile rubber.

EXAMPLE 14

Use of Processing Aid in Peroxide-Cured EPDM Automotive Disk Brake Boot Compound Employing equipment and procedures similar to those described in Example 12, a control compound of peroxide-cured EPDM rubber was prepared by mixing 100 parts of EPSYN 4506 EPDM rubber (sold by Colpolymer), 70 parts carbon black, 5 parts zinc oxide, 2 parts Agerite Resin D (polymerized 1,3-dihydro-2,2,4-trimethylquinoline sold by R. T. Vanderbilt Co.), 10 parts of Circosol 4240 processing oil, and 9 parts of peroxide curing agent (Varox DCP-40C sold by R. T. Vanderbilt Co.). Mixing time was 6 minutes to a dump temperature of 245° F.

A second compound was prepared containing 1.96 parts of Powdered Aid B, which was added one minute before dumping the batch. Mixing time was reduced to 5 minutes and the dump temperature was reduced to 233° F.

Both compounds were vulcanized. The 100% cure time was 14 minutes for the control, 13 minutes for the compound containing Aid B of this invention, and only 12 minutes after storing for 24 hours.

Other properties of the rubber compounds and vulcanized rubbers were:

|  | EPDM Rubber | | |
|---|---|---|---|
|  |  | With Aid B | |
| Property | Control | Immediate | 24 Hour |
| Mooney Viscosity | 32 | 27 | 27 |
| Scorch @ 300° F., min. | 9 | 9 | 9 |
| Tensile Strength, psi. | 2025 | 2045 | 2045 |
| Modulus @ 100%, psi. | 455 | 465 | 465 |
| Die "C" Tear | 280 | 290 | 290 |
| Shore A Hardness | 61 | 61 | 61 |
| Cured Finish (1–15) | 8 | 13 | 13 |
| Cured Shine (1–15) | 9 | 14 | 14 |

EXAMPLE 15

Use of Three-Component Process Aid A in Neoprene Rubber Compound

Employing equipment and procedures similar to those described in Example 12, a control neoprene rubber compound was prepared from 100 parts Neoprene W rubber (sold by DuPont), 75 parts of carbon black, 7 parts of a hydrocarbon processing aid (Sundex Z-90 sold by Iron Oil Co.), 0.5 part stearic acid, 4 parts magnesium dioxide (Maglite D sold by C. P. Hall Co.), 5 parts zinc oxide, and 1 part activated thiadiazine (Vanax NP sold by R. T. Vanderbilt Co.). Mixing time was 7 minutes to a dump temperature of 255° F.

A second compound was prepared containing 1.93 parts of powdered Processing Aid B, which was added 2 minutes before dumping the batch. Mixing time was only 6 minutes and the dump temperature was only 240° F.

The 100% cure time for the control compound at 300° F. was 13 minutes, but only 11 minutes for the compound containing Processing Aid B.

Other properties of the compound and vulcanized rubber were:

|  | Neoprene Rubber | | |
|---|---|---|---|
|  |  | With Aid B | |
| Property | Control | Immediate | 24 Hour |
| Mooney Viscosity | 51 | 43 | 43 |
| Scorch @ 300° F., min. | 7 | 7 | 7 |
| Tensile Strength, | 2130 | 2230 | 2230 |

|  | Neoprene Rubber | | |
|---|---|---|---|
|  |  | With Aid B | |
| Property | Control | Immediate | 24 Hour |
| psi. |  |  |  |
| Modulus @ 100%, psi. | 550 | 555 | 555 |
| Elongation, % | 380 | 405 | 405 |
| Die "C" Tear | 360 | 365 | 365 |
| Shore A Hardness | 60 | 60 | 60 |
| Cured Finish (1–15) | 9 | 11 | 11 |
| Cured Shine (1–15) | 8 | 12 | 12 |

EXAMPLE 16

Use of Three-Component Processing Aid B in Passenger Radial Tire Tread Compound

Employing equipment and procedures similar to those described in Example 12, a control passenger radial tire tread compound was prepared from 20 parts of SMR-20 (smoked natural rubber sold by General International Denomination), 55 parts of PBD-1252 (polybutadiene rubber sold by Firestone), 62.5 parts of SBR-1712 (styrene-butadiene rubber sold by Goodyear), 70 parts of carbon black, 2 parts of Agerite Resin D, 5 parts of Sunolite 240 processing aid, 2 parts of stearic acid, 3 parts of zinc oxide, 1 part of N-cyclohexyl-2-benzothiazole sulfenamide (Durox sold by R. T. Vanderbilt Co.), and 1.75 parts of rubber maker's sulfur. Mixing time was 9 minutes to a dump temperature of 295° F.

A second composition was made containing 2.22 parts of Processing Aid B added 2 minutes before dumping the batch. Mixing time was reduced to 8 minutes and the dump temperature was reduced to 245° F.

Both compounds were vulcanized at 300° F. The 100% cure time for the control was 13 minutes, whereas the 100% cure time was only 11 minutes with Process Aid B and only 10 minutes after storing for 24 hours.

Other properties were:

|  | Tire Tread Compound | | |
|---|---|---|---|
|  |  | With Aid B | |
| Property | Control | Immediate | 24 Hour |
| Mooney Viscosity | 53 | 42 | 42 |
| Scorch @ 300° F., min. | 8 | 8 | 8 |
| Tensile Strength, psi. | 2410 | 2480 | 2480 |
| Modulus @ 100%, psi. | 390 | 405 | 405 |
| Elongation, % | 580 | 595 | 595 |
| Die "C" Tear | 320 | 330 | 330 |
| Shore A Hardness | 60 | 60 | 60 |
| Cured Finish (1–15) | 9 | 14 | 14 |
| Cured Shine (1–15) | 8 | 13 | 13 |

As can be seen from Examples 11–16, the powdered Processing Aid B of Example 1 was effective in a wide variety of rubber compounds. It afforded decreased mixing times and reduced dump temperatures and Mooney viscosity of each rubber compound. It materially decreased vulcanization time without adversely affecting scorch time. Furthermore, it afforded improved physical properties and appearance of the vulcanized rubber. Similar results are achieved by substituting the paste Processing Aid A of Example 10 for powder Processing Aid B.

EXAMPLE 17

Employing apparatus and procedures similar to those described in Example 12, a styrene-butadiene/natural rubber compound was prepared from 55 parts of SBR-1551 (styrene-butadiene rubber made by Goodyear), 10 parts of PBD-1228 (polybutadiene rubber made by Firestone), 30 parts of SMR-20 (smoked natural rubber made by General International Denomination), 60 parts of carbon black, 1.25 parts of stearic acid, 9 parts of Sundex Z-90, and 5 parts of zinc oxide.

In addition, four experimental compounds were prepared by mixing the control compound with silicone fluid F-1080 (Compound K-1), with a mixture of F-1080 and dodecylbenzene sulfonic acid which had been allowed to stand at room temperature for about 1 hour before use (Compound K-2), with F-1080, dodecylbenzene sulfonic acid and Silwet L-77 which had not been pre-mixed (Compound K-3), and processing aid of this invention prepared by mixing SF-1080, dodecylbenzene sulfonic acid and Silwet L-77, and allowing the mixture to stand at room temperature for about 1 hour (Compound K-4)

The amounts of the various ingredients, respective mixing times, and properties of the various compounds and vulcanized products are as follows:

| | | Experimental Compounds | | | |
|---|---|---|---|---|---|
| Composition | Control | K-1 | K-2 | K-3 | K-4 |
| Control | 100 | 90 | 85 | 83 | 83 |
| SF-1080 | — | 10 | 10 | 10 | 10 |
| DDBSA* | — | — | 5 | 5 | 5 |
| Silwet 77 | — | — | — | 2 | 2 |
| Mixing Time, min. | 9 | 10.5 | 9 | 9 | 8 |
| Cure Time, min. | | | | | |
| Mooney Viscosity | 55 | 49 | 48 | 48 | 46 |
| Tensile Strength, psi. | 3725 | 3650 | 3790 | 3750 | 3950 |
| Modulus @ 100%, psi. | 390 | 380 | 400 | 400 | 420 |
| Adhesion 1" Strip, lb. | 20 | 18 | 20 | 20 | 22 |
| Mold Release, gm. | 4700 | 3900 | 3850 | 4625 | 3700 |

*DDBSA = Dodecylbenzene sulfonic acid.

As is evident from the foregoing data, when silicone lubricant SF-1080 alone is added to the rubber compound (Compound K-1), mixing time increased over the control due to incompatibility of the silicone fluid with the rubber. Further, although Mooney viscosity and mold release were decreased by the silicone fluid, there also was a decrease in tensile strength, modulus and adhesion.

When a pre-formed blend of silicone fluid and dodecylbenzene sulfonic acid in accordance with this invention is used (Compound K-2), there is no change in mixing time or adhesion, but Mooney viscosity and mold release decrease while tensile strength and modulus increase compared to the control.

When the preformed three-component composition of this invention (Compound K-4) is used, it is seen that it is even more effective than the two-component blend (Compound K-2). Mixing time is decreased, as is Mooney viscosity and mold release, while tensile strength, modulus and adhesion all are increased.

Similar improvements were not observed when the three components were not pre-blended, but rather were added separately to the rubber compound on the mill (Compound K-3). As compared with the control, mixing time was unchanged, and only modest improvements in tensile strength, modulus and mold release were observed. Indeed, the performance of this compound was inferior to that made with the two-component pre-formed blend (Compound K-2).

Similar results were observed when the same series of experiments was carried out using an EPDM rubber compound formulation.

These data establish that when a peptizer and a silicone lubricant are pre-blended in accordance with my prior invention, a silicone-based processing aid having improved compatibility with rubber is obtained. In addition, when a silicone surfactant is included in the composition in accordance with this invention, there is obtained a reduction in mixing and vulcanization times, and further improvements in physical properties of the vulcanized rubber.

EXAMPLE 18

Employing apparatus and procedures similar to those described in Example 12, a high quality truck tread compound was prepared (Sample L-1) from 30 parts of SMR-20 smoked natural rubber, 10 parts of PBD-1252 poly (butadiene) rubber, 55 parts of SB-1551 styrene-butadiene rubber, 60 parts of carbon black, 1.25 parts stearic acid, 9.00 parts Sundex 790 processing aid, 5.0 parts zinc oxide, 0.7 parts Santocure accelerator was mixed and 3.00 parts of rubber maker's sulfur were added on the mill. Mixing time was 9 minutes, dump temperature was 290° F. and, Mooney viscosity of the mixture was 58° at 212° F.

A second compound (Sample L-2) was prepared by adding silicone lubricant SF-1076 to the compound 2 minutes before dumping the batch. Mixing time remained at 9 minutes, while dump temperature decreased slightly to 280° C. and Mooney viscosity decreased slightly to 280° F.

A third component (Sample L-3) was prepared by adding pentachlorothiophenol peptizers to the compound before beginning mixing, and then adding SF-1076 to the compound 2 minutes before dumping the batch. Mixing time decreased to 8 minutes, dump temperature decreased to 8 minutes, and Mooney viscosity decreased to 54.

A fourth compound was prepared in a manner similar to that for Sample L-3 (Sample L-4), except that Silwet 77 silicone surfactant was added to the compound with SF-1706 two minutes before dumping the batch. Mixing time was 7 minutes, dump temperature was 260° F., and Mooney viscosity was 52.

A fifth compound was prepared using a three-component processing aid of this invention composed of a pre-formed blend of 58.8% SF-1706, 11.8% Silwet 77, and 29.4% of pentachlorothiophenol, the sample proportions as used in Sample L-4. The processing aid was added to the compound 2 minutes before dumping the batch. Mixing time was only 6 minutes, 33 percent less than that of control batch (Sample L-1), and dump temperature was 240° F., 50° F. below that for Sample L-1. Mooney viscosity was only 45, as compared to 58 for Sample L-1.

Each of the compounds was vulcanized by heating to about 300° F., using the santocure accelerator and rubber maker's sulfur referred to above as a vulcanizing agent. Properties of the vulcanized compounds are reported in the table below:

| | Rubber Composition | | | | |
|---|---|---|---|---|---|
| | L-1 | L-2 | L-3 | L-4 | This Invention |
| Additive | | | | | |
| SF-1706 | — | 10 | 10 | 10 | 10 |
| Silwet 77 | — | — | — | 2 | 2 |
| Pentachlorothiophenol | — | — | 5 | 5 | 5 |
| Property | | | | | |
| Scorch @ 300° F., min. | 8 | 8 | 8 | 8 | 8 |
| 100% Cure @ 300° F., min. | 13 | 13 | 13 | 12 | 9 |
| Tensile, psi. | 3790 | 3795 | 3860 | 3980 | 4010 |
| Modulus @ 100%, psi. | 400 | 405 | 410 | 415 | 425 |
| Elongation, % | 500 | 510 | 515 | 520 | 550 |
| Adhesion, 1" strip, lb. | 19 | 19 | 20 | 21 | 23 |
| Mold Release, gm. | 2795 | 4683 | 4320 | 4160 | 2991 |

From the foregoing, it can be seen that SF-1706 lubricant alone, although reasonably compatible with the rubber compound, afforded little, if any, improvement in rubber properties. The pre-formed, three-component blend of this invention, in contrast, offered significant improvement in properties over the control without additives (Sample L-1). When the results obtained with this processing aid are compared with results obtained when the three ingredients were added directly to the compound without pre-mixing (Sample L-4), it can be seen that pre-mixing afforded a 25% reduction in cure time and a 28% reduction in mold release, while at the same time affording increased tensile strength, modulus, elongation and adhesion.

What is claimed is:

1. A processing aid for lubricating and improving the processability of a rubber compound without adversely affecting the adhesion, tack, modulus and tensile strength of the rubber comprising a silicone fluid lubricating agent, having poor compatibility in rubber, which has been mixed with a peptizing agent selected from the group consisting of an alkylbenzene sulfonic acid represented by the formula:

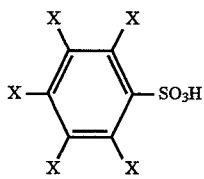

wherein each X is hydrogen or a branched or straight chain alkyl group having from 4 to 14 carbon atoms, thiazole accelerators, phenyl hydrazine and its derivatives, alkyl and aryl mercaptans and dithio-bisbenzanilides, said mixing being prior to adding the processing aid to the rubber and the proportions of said silicone lubricating agent and said peptizing agent being sufficient to render the lubricating agent more compatible with the rubber to which the processing aid is to be added.

2. A processing aid to according to claim 1 wherein said lubricating agent is a polydimethylsiloxane which is trimethylsiloxy terminated and which has a viscosity of from about 5,000 to about 60,000 centistokes at room temperature.

3. A processing aid according to claim 1 wherein said alkyl benzene sulfonic acid is represented by the formula:

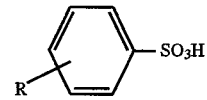

wherein R has between about 8 to about 12 carbons.

4. A processing aid according to claim 1 wherein the lubricating agent is a functionally terminated silicone lubricant having the general formula:

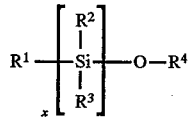

wherein each $R^1$, $R^2$, $R^3$ and $R^4$ is a hydrocarbyl or a hydrocarboxy group, provided that at least one hydrocarbyl or hydrocarboxy group has a functional group capable of reacting with the sulfonic acid, and x is a number determined by the size of the silicone lubricating agent.

5. A processing aid according to claim 1 wherein said peptizing agent is dodecylbenzene sulfonic acid.

6. A processing aid according to claim 1 further comprising at least one member selected from the group consisting of salts of long chain fatty acids having from about 14 to about 22 carbon atoms.

7. A processing aid according to claim 6 wherein said member is selected from the group consisting of zinc oleate, zinc stearate and zinc palmitate.

8. A processing aid according to claim 1 wherein said peptizing agent is selected from the group consisting of mercaptobenzothiazole, cyclohexybenzothiazole sulphenamide, phenyl hydrazine, thio-B-naphthol, xylyl mercaptan, pentachlorothiophenol, zinc pentachlorothiophenate, dodecylbenzene sulfonic acid, dithio-bisbenzanilide, and N-tallow alkyltrimethylenediamine oleate.

9. A processing aid according to claim 1 wherein the ratio of lubricating agent to peptizing agent is from 0.2:1 to 15:1 by weight.

10. A processing aid according to claim 1 further including a silicone fluid surfactant in an amount sufficient to reduce cure time of a rubber compound to which the processing aid is added.

11. A processing aid according to claim 10 in which the silicone lubricating agent, silicone surfactant and peptizer are present in the respective proportions of 30–70 weight percent, 3–40 weight percent, and 25–65 weight percent, based on the total amounts of the three ingredients.

12. A processing aid according to claim 11 wherein the respective proportions are 50–70 weight percent, 10–15 weight percent, and 25–35 weight percent.

13. A powder form of a processing aid according to claim 1 in which the ingredients are dispersed on a particulate solid carrier selected from the group consisting of clay and silicon dioxide having a particle size of up to 15 microns.

14. A powder form of a processing aid according to claim 10 in which the ingredients are dispersed on a particulate solid carrier selected from the group consisting of clay and silicon dioxide having a particle size of up to 15 microns.

15. A processing aid according to claim 14 in which the relative proportions of silicone lubricant, silicone surfactant and peptizer are 25–35 weight percent, 35–45 weight percent, and 25–35 weight percent.

16. A processing aid according to claim 14 comprising 20–50 weight percent carrier, 1–20 weight percent silicone lubricant, 6–25 weight percent silicone wetting agent, 1–20 weight percent of a peptizing agent, and up to 30 weight percent of a non-silicone lubricant.

17. A liquid or paste form of a processing aid according to claim 1 in which the ingredients are dispersed in a hydrocarbon wax which is compatible with rubber selected from the group consisting of petrolatum, paraffin wax and polyethylene wax.

18. A liquid or paste form of a processing aid according to claim 10 in which the ingredients are dispersed in a hydrocarbon wax which is compatible with rubber selected from the group consisting of petrolatum, paraffin wax and polyethylene wax.

19. A liquid or paste processing aid according to claim 18 wherein the relative proportions of silicone lubricant, silicone surfactant, and peptizer are 30–40 weight percent, 3–10 weight percent, and 50–65 weight percent.

20. A liquid or paste processing aid according to claim 18 comprising 5–40 weight percent hydrocarbon wax, 1–10 weight percent silicone lubricant, 5–25 weight percent of a silicone fluid wetting agent, 10–25 weight percent of wetting agent, and up to about 50 weight percent of a non-silicone lubricant.

21. A method for processing a rubber compound which comprises mixing a processing aid according to any one of claims 1–20, with said rubber compound to form a homogeneous composition, then curing the resulting composition.

22. A vulcanized rubber composition produced according to the method of claim 21.

23. A processing aid for lubricating and improving the processability of a rubber compound without adversely affecting the adhesion, tack, modulus and tensile strength of the rubber comprising a silicone fluid lubricating agent, having poor compatibility in rubber, which has been mixed with a peptizing agent selected from the group consisting of mercaptobenzothiazole, cyclohexybenzothiazole sulphenamide, phenyl hydrazine, thio-B-naphthol, xylyl mercaptan, pentachlorothiophenol, zinc pentachlorothiophenate, dithio-bisbenzanilide, N-tallow alkyltrimethylenediamine oleate and an alkylbenzene sulfonic acid represented by the formula:

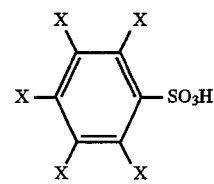

wherein each X is hydrogen or a branched or straight chain alkyl group having from 4 to 14 carbon atoms, said mixing being prior to adding the processing aid to the rubber and the proportions of said silicone lubricating agent and said peptizing agent being in the ratio of from 0.2:1 to 15:1 by weight and sufficient to render the lubricating agent more compatible with the rubber to which the processing aid is to be added.

24. A processing aid according to claim 23, wherein said peptizing agent is dodecylbenzene sulfonic acid.

25. A processing aid according to claim 23 wherein said peptizing agent is pentachlorothiophenol.

26. A processing aid for lubricating and improving the processability of a rubber compound without adversely affecting the adhesion, tack, modulus and tensile strength of the rubber comprising a silicone fluid lubricating agent, having poor compatibility in rubber, which has been mixed with a peptizing agent selected from the group consisting of alkyl mercaptans, aryl mercaptans and an alkylbenzene sulfonic acid represented by the formula:

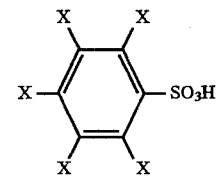

wherein each X is hydrogen or a branched or straight chain alkyl group having from 4 to 14 carbon atoms, said mixing being prior to adding the processing aid to the rubber and the proportions of said silicone lubricating agent and said peptizing agent being in the ratio of from 0.2:1 to 15:1 by weight and sufficient to render the lubricating agent more compatible with the rubber to which the processing aid is to be added.

* * * * *